May 16, 1967 J. H. MERCIER 3,319,658
SEALING DEVICE FOR PRESSURE VESSELS
Filed April 30, 1964 2 Sheets-Sheet 1

INVENTOR
JACQUES HENRI MERCIER
BY
ATTORNEYS

May 16, 1967 J. H. MERCIER 3,319,658
SEALING DEVICE FOR PRESSURE VESSELS
Filed April 30, 1964 2 Sheets-Sheet 2

INVENTOR
Jacques Henri Mercier
BY
ATTORNEYS

United States Patent Office 3,319,658
Patented May 16, 1967

3,319,658
SEALING DEVICE FOR PRESSURE VESSELS
Jacques H. Mercier, Neuilly-sur-Seine, France, assignor to Mercier Olaer Patent Corporation, Wilmington, Del., a corporation of Delaware
Filed Apr. 30, 1964, Ser. No. 363,873
Claims priority, application France, May 17, 1963, 935,207
3 Claims. (Cl. 138—30)

This invention relates to the art of sealing devices, more particularly for use in a pressure accumulator.

As conducive to an understanding of the invention, it is noted that where a pressure accumulator is of the type comprising a cylindrical container open at one end and closed at its other, with a port through said closed end, and with said open end having positioned therein a cylindrical member having an axial port and a deformable and expansible partition is positioned in said container intervening between said ports and defining two chambers to receive two fluids under pressure, unless an effective seal can be provided between the adjacent peripheries of said cylindrical member and said container, leakage of fluid will occur through the space therebetween.

Furthermore, where the bladder when expanded is free to extrude into the space between the container and the cylindrical member, the bladder is likely to be pinched and cut with resultant failure of the accumulator.

It is accordingly among the objects of the invention to provide a seal for a cylindrical closure member of a cylindrical pressure vessel, which may readily be fabricated at low cost, and which permits ready insertion of the closure member into the pressure vessel and ready removal thereof, with assurance that a dependable fluid-tight seal will be provided regardless of the pressure in said pressure vessel.

Another object is to provide a seal for use in a pressure vessel of the above type having a deformable bladder therein adapted to contain a fluid under pressure and which seal will preclude extrusion of the bladder into the space between the cylindrical closure member and the cylindrical pressure vessel.

According to the invention, these objects are accomplished by the arrangement and combination of elements hereinafter described and more particularly recited in the claims.

Figure 1:
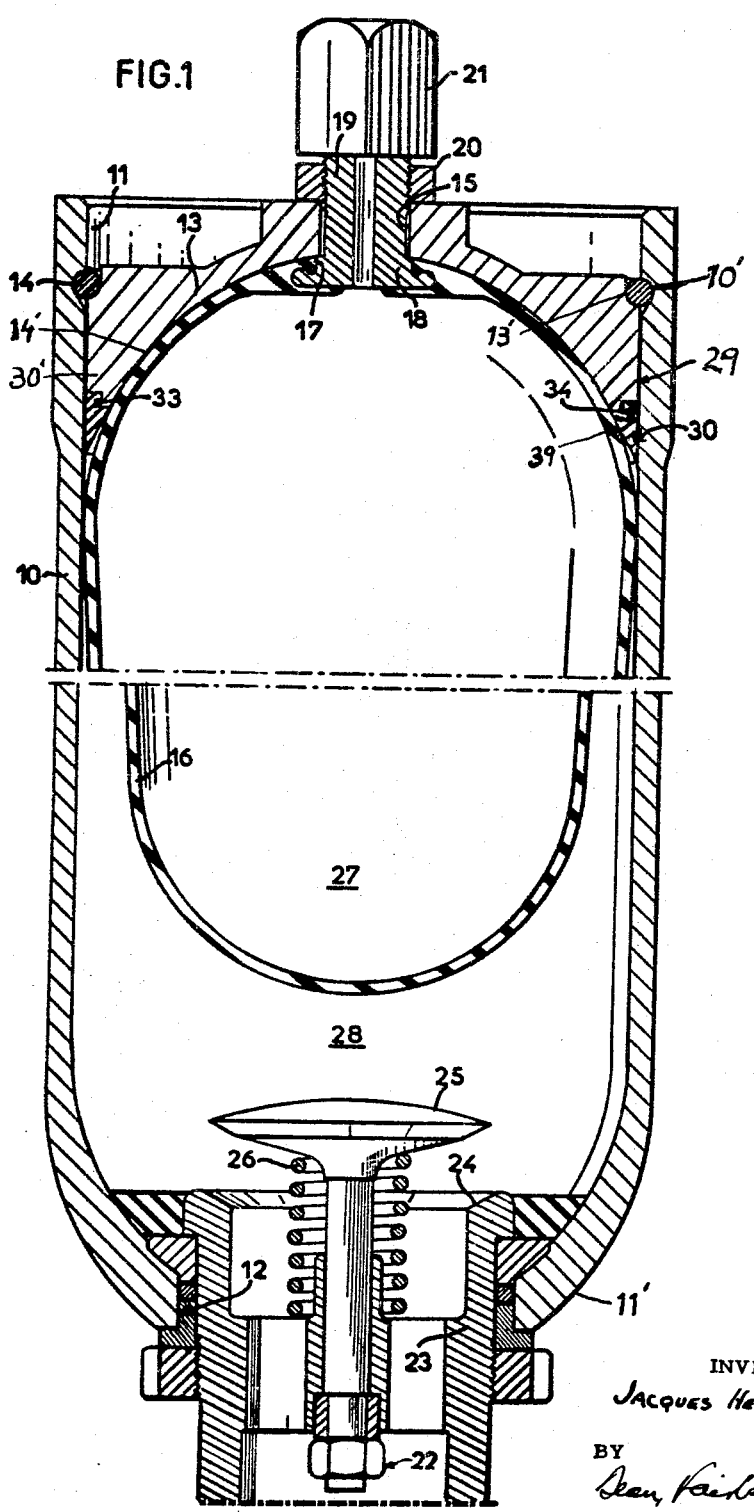
Figure 2:
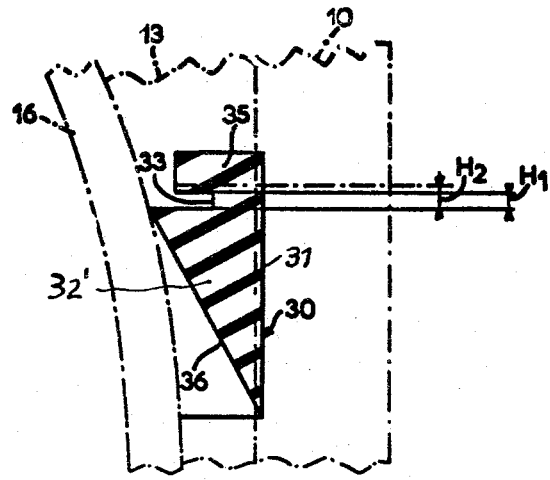
Figure 3:
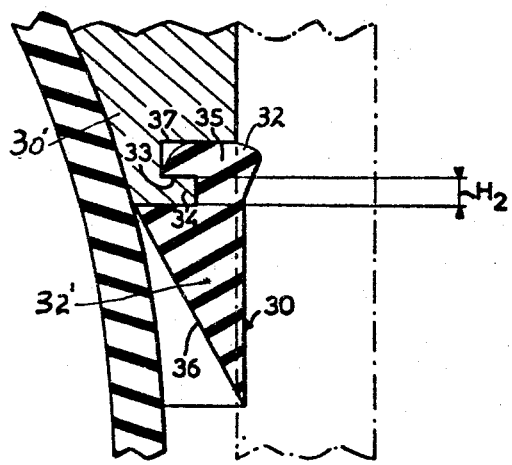
Figure 4:
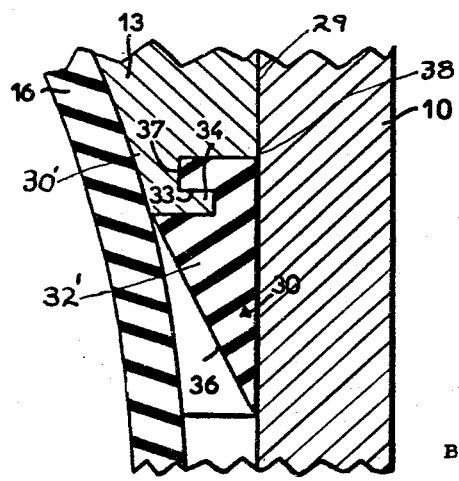

In the accompanying drawings in which are shown one of various possible embodiments of the several features of the invention, FIG. 1 is a longitudinal cross sectional view of a pressure accumulator according to the invention, FIG. 2 is a cross sectional view on a larger scale of the sealing member according to the invention, FIG. 3 is a view similar to FIG. 2 of the sealing member mounted on the cover member, and FIG. 4 is a view similar to FIG. 2 of the sealing member mounted on the cover member and positioned in the container of the pressure accumulator.

Referring now to the drawings, the invention is illustratively shown incorporated in a pressure accumulator which comprises a container 10 of any suitable rigid material such as steel, capable of withstanding high pressures. The container 10 which is cylindrical along its entire length, is open at one end as at 11 and has its other end rounded as at 11' with an axial opening 12 therethrough.

In order to close the open end 11 of the container, a closure member 13 in the shape of a disc having a cylindrical periphery is positioned in the open end 11 of the container inwardly past an annular groove 10' in the inner wall surface thereof. A locking ring 14 of spring steel, for example, cylindrical in cross section, is positioned in said annular groove 10' and protrudes therefrom into the container. The closure member 13 has an annular groove 13' in its outer periphery adjacent its top surface which is adapted to abut against the protruding portion of the sealing ring 14 when the closure member 13 is pushed outwardly in the manner hereinafter described, to limit the outward movement of said closure member.

As is clearly shown in FIG. 1, the closure member 13 has a concave undersurface 14' and an axial opening 15 through which extends a hollow stem 19 having a flange 18 at its inner end which is bonded to the mouth 17 of a deformable and expansible partition in the form of an elongated bladder 16. The stem 19 is securely retained in position by a lock nut 20 screwed on the threaded end of the stem 19 which protrudes from opening 15 in cover 13, a cap 21 also being screwed on the end of the stem to protect the conventional air valve (not shown) positioned in the stem.

The axial opening 12 of the container has positioned therein a closure assembly 22 which comprises a sleeve 23, the inner end of which defines a seat 24 for a valve head 25 normally urged to open position by a coil spring 26. As the closure assembly may be of the type shown in Patent No. 2,931,392 and forms no part of the invention, it will not be further described.

The bladder 16 which intervenes between the ports 15 and 12 of the container 10, defines two chambers 27 and 28, the former inside the bladder 16 and the latter between the exterior of the bladder 16 and the wall of container 10 and the undersurface of cover member 13.

The bladder 16 when initially charged with a fluid such as gas under pressure, will expand to fill the chamber defined by the container and cover member. As a result, the closure member 13 will be forced outwardly until its annular groove 13' abuts against the sealing ring 14 which will limit the outward movement of the cover member.

Thereupon a fluid such as oil is forced into the chamber 28 through sleeve 23, under a pressure greater than that under which the gas is charged into the bladder 16 thereby compressing the bladder and the gas therein.

When the chamber 28 has been charged, a valve (not shown) controlling the inlet to sleeve 23 is closed and the pressure accumulator is ready for use.

In order to use the charged accumulator, the valve (not shown) controlling the sleeve 23 is opened. As a result, the bladder 16 will expand to force the oil from chamber 28 out from sleeve 23, the valve head 25 being retained spaced from its seat 24 by the coil spring 26.

When the bladder has expanded sufficiently so that its lower end contacts the valve head 25, it will move the latter onto its seat 24 to close the outlet and prevent extrusion of the bladder with resultant injury thereto.

Means are provided to insure that there be no leakage of fluid from chamber 28 through the space 29 between the wall of container 10 and the cylindrical periphery of the cover member 13, nor extrusion of the bladder 16 into such space.

To this end, as is clearly shown in the drawings, the closure member 13 has an annular groove 37 in its outer periphery adjacent its inner end 30' and the portion of said closure member between said annular groove 37 and the extremity of said inner end is of smaller diameter than that of the cylindrical closure member 13 and of greater diameter than the inner diameter of said groove 37 and defines an annular flange 34.

Mounted on the inner end 30' of the closure member 13 is an annular sealing member 30 of compressible, resilient material such as rubber or the like.

The sealing member 30 in its normal unstressed state before it is mounted on the closure member as shown in FIG. 2, has a cylindrical outer wall surface 31 and its inner surface 36 tapers inwardly as shown to define a wedge shaped portion 32' in the form of a right angle triangle. The sealing member 30 has an annular groove 33 in its inner periphery slightly below its upper surface; the latter being of width less than that of the portion of the sealing member immediately below the groove 33 to define an annular flange 35.

To mount the sealing member 30 on the end 30' of the closure member 13 it is merely necessary to position the annular flange 35 of the sealing member in the annular groove 37 of the closure member 13 and the flange 34 of the closure member 13 in the annular groove 33 of the sealing member.

The height $H_1$ of the groove 33 of the sealing member is less than the height $H_2$ of the flange 34 of the closure member 13 so that when the sealing member 30 is mounted on the end 30' of the closure member 13, as above described, prior to insertion of the closure member 13 into the container, due to the difference in the heights of the flange 34 and groove 33, the material of the sealing member adjacent the flange and groove will be forced outwardly as at 32 to define an annular rib.

It is also to be noted that the sealing member 30 is of such thickness that when mounted on the closure member 13 as shown in FIG. 3, prior to insertion of the closure member into the container, the outer periphery of the sealing member 30 will be of diameter greater than that of the closure member and that of the inner diameter of the container.

With the construction above described, when the closure member 13 with the sealing member secured thereto and the bladder 16 mounted thereon is moved into the container 10, the outer surface of the sealing member will engage the wall of the container and the annular rib 32 will be compressed, forming a secure seal with respect to the container wall at the inlet 38 to the space 29 between the container wall and the periphery of the closure member. Due to the compression of the rib 32, even with low pressure in the container, a dependable fluid tight seal will be provided. With increase in pressure in the container, since the rib 32 will have been compressed as above set forth, the differential between the pressure in the container and that outside the container will tend to cause such compressed rib to wedge in the inlet 38 to said space 29 insuring that the sealing action is effected.

As the bladder expands in use of the pressure accumulator, the portion 39 thereof adjacent the inclined surface 36 of the sealing member 30 will press against the latter forcing it tightly against the container wall and providing a continuous surface for the bladder so that it cannot extrude into the inlet 38 of space 29.

With the construction above described, a highly effective seal is provided for a cylindrical closure member in a cylindrical container for one or more fluids under pressure and more particularly the sealing member is especially effective for use with a deformable partition or bladder in a pressure accumulator, as the sealing member in addition to its effectiveness as a seal also provides a continuous surface for the bladder adjacent the seal, to prevent extrusion of the bladder.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a cylindrical container having a port at one end and open at the other end, a substantially cylindrical closure member positioned in the open end of said container, means to prevent outward movement of said closure member from said container, said closure member having a port therethrough, a deformable and expansible bladder in said container intervening between said ports and defining a chamber on each side thereof, said bladder having a mouth at one end, means securing the mouth of said bladder to the closure member so that the bladder extends substantially axially of said container, said closure member having an annular flange at its inner end on its outer periphery, an annular sealing member of compressible resilient material having an annnular groove on its inner surface of height less than that of said flange, whereby when said annular sealing member is positioned over the inner end of said closure member with said annular flange forced into said annular groove, the material of said sealing member will be forced outwardly to press against the wall of said container to form a seal, said sealing member having a wedge shaped portion integral therewith, having an inclined surface, said inclined surface extending outwardly from the inner end of the closure member toward the wall of the container, said bladder wall when said bladder expands pressing against the inclined surface of said wedge shaped portion.

2. The combination set forth in claim 1 in which the closure member has an annular groove in its outer periphery, the surface of the annular flange remote from the inner end of the closure member forming the floor of said annular groove, and said sealing member has an annular flange on its outer end on its inner periphery, the outer surface of the annular groove in said sealing member forming the top wall of said annular flange on said sealing member, said closure member groove receiving the annular flange of said sealing member when the sealing member is positioned on the inner end of said closure member.

3. The combination set forth in claim 1 in which said annular groove in said sealing member and said annular flange on said cover member are substantially rectangular in cross section.

References Cited by the Examiner

UNITED STATES PATENTS

| | | | |
|---|---|---|---|
| 2,076,363 | 4/1937 | Brunner | 277—178 |
| 2,543,585 | 2/1951 | Miller | 138—30 |
| 2,760,518 | 8/1956 | Peet | 138—30 |
| 2,993,629 | 7/1961 | Ruhnke | 277—178 X |
| 3,211,184 | 10/1965 | Greer | 138—30 |
| 3,244,802 | 4/1966 | Sturtevant et al. | 277—178 X |

FOREIGN PATENTS 785,454   10/1957   Great Britain.

LAVERNE D. GEIGER, *Primary Examiner.*

T. L. MOORHEAD, *Assistant Examiner.*